(12) United States Patent
Mohri et al.

(10) Patent No.: US 8,778,553 B2
(45) Date of Patent: Jul. 15, 2014

(54) FUEL CELL

(75) Inventors: Masahiro Mohri, Utsunomiya (JP); Kentaro Nagoshi, Utsunomiya (JP); Masaru Oda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1769 days.

(21) Appl. No.: 11/378,885

(22) Filed: Mar. 17, 2006

(65) Prior Publication Data
US 2007/0009779 A1 Jan. 11, 2007

(30) Foreign Application Priority Data
Mar. 17, 2005 (JP) ................. 2005-076209

(51) Int. Cl.
*H01M 8/04* (2006.01)

(52) U.S. Cl.
USPC .................... 429/457; 429/512; 429/120

(58) Field of Classification Search
USPC ................................... 429/231.8
See application file for complete search history.

(56) References Cited

U.S. PATENT DOCUMENTS

| | | | | |
|---|---|---|---|---|
| 5,547,776 | A * | 8/1996 | Fletcher et al. | 429/434 |
| 7,169,496 | B2 | 1/2007 | Enjoji et al. | |
| 2001/0044042 | A1* | 11/2001 | Inoue et al. | 429/35 |
| 2002/0064702 | A1* | 5/2002 | Gibb | 429/34 |
| 2004/0095127 | A1* | 5/2004 | Mohri et al. | 324/117 R |
| 2004/0101739 | A1* | 5/2004 | Enjoji et al. | 429/40 |
| 2004/0110049 | A1* | 6/2004 | Shimotori et al. | 429/25 |
| 2005/0277013 | A1* | 12/2005 | Yamaga et al. | 429/38 |

FOREIGN PATENT DOCUMENTS

| | | | |
|---|---|---|---|
| JP | 60-189868 | 9/1985 | |
| JP | 1-320772 | 12/1989 | |
| JP | 3-261073 | 11/1991 | |
| JP | 5-144451 | 6/1993 | |
| JP | 7-122280 | 5/1995 | |
| JP | 8-306381 | 11/1996 | |
| JP | 2001-143740 | * 5/2001 | ............. H01M 8/24 |
| JP | 2004-158217 | 6/2004 | |
| JP | 2004-171824 | 6/2004 | |

OTHER PUBLICATIONS

Japanese Office Action for Application No. 2005-076209, dated Nov. 2, 2010.

* cited by examiner

*Primary Examiner* — Maria J Laios
(74) *Attorney, Agent, or Firm* — Nelson Mullins Riley & Scarborough LLP; Anthony A. Laurentano (57) ABSTRACT

A fuel cell includes a membrane electrode assembly and an anode side metal separator and a cathode side metal separator sandwiching the membrane electrode assembly. An oxygen-containing gas flows in an oxygen-containing gas flow field in a horizontal direction. A coolant flows in a coolant flow field in a vertical direction. The coolant flow field is connected to coolant supply passages and coolant discharge passages. The opening of one of the coolant supply passages and the opening of one of the coolant discharge passages are smaller than those of the other coolant supply passages and the other coolant discharge passages in cross section, respectively. Thus, the flow rate of the coolant supplied to an area near outlets of the oxygen-containing gas flow field and the fuel gas flow field become smaller than the flow rate of the coolant supplied to the other area.

15 Claims, 10 Drawing Sheets

PRIOR ART

FUEL CELL

BACKGROUND OF THE INVENTION

1. Field of the Invention

The present invention relates to a fuel cell formed by stacking electrolyte electrode assemblies and separators alternately in a horizontal direction. Each of the electrolyte electrode assemblies includes a pair of electrodes and an electrolyte interposed between the electrodes. A reactant gas flow field for supplying a reactant gas is formed between the electrode electrolyte assembly and one of separators sandwiching the electrolyte electrode assembly for supplying a reactant gas along a surface of the electrode, and a coolant flow field is formed between adjacent separators which are stacked together for allowing a coolant to flow in a direction substantially perpendicular to the flow direction of the reactant gas.

2. Description of the Related Art

For example, a polymer electrolyte fuel cell employs a membrane electrode assembly (MEA) which includes an anode, a cathode, and an electrolyte membrane (electrolyte) interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined number of the power generation cells are stacked together alternately to form a fuel cell stack.

In the power generation cell, a fuel gas flow field (reactant gas flow field) for supplying a fuel gas along the surface of the anode and an oxygen-containing gas flow field (reactant gas flow field) for supplying an oxygen-containing gas along the surface of the cathode are formed on a pair of separators sandwiching the membrane electrode assembly. Further, a coolant flow field for cooling the power generation surfaces of the membrane electrode assembly is formed between the adjacent separators which are stacked together.

Figure 10:
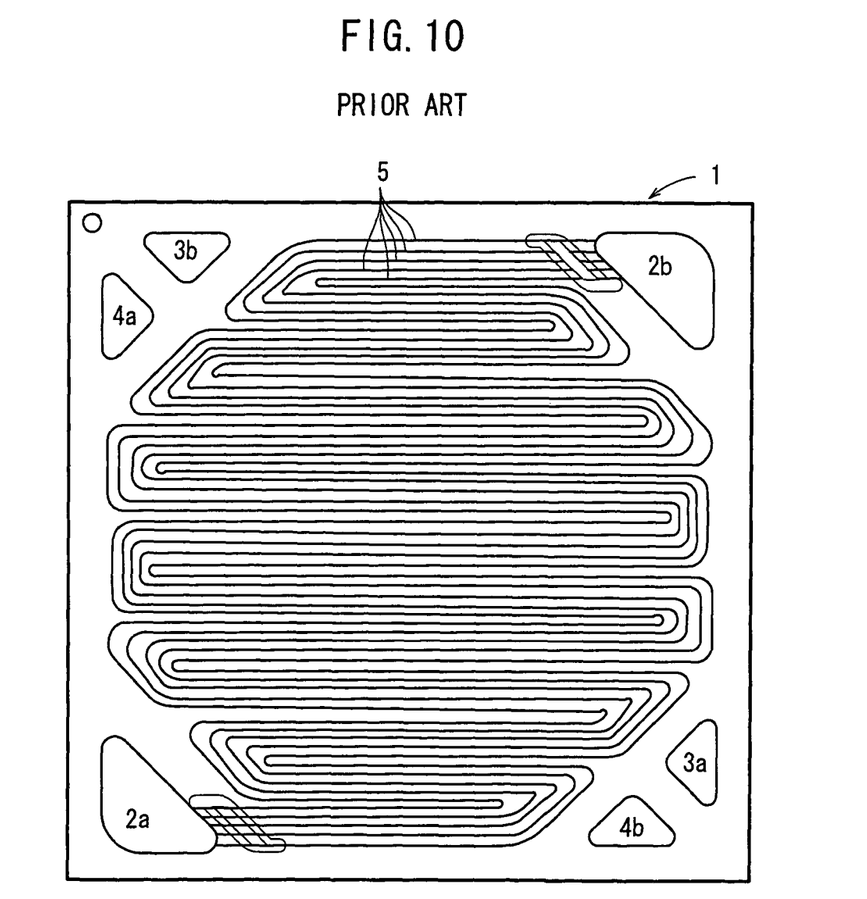
FIG. 10 is a front view showing a conventional plate.

For example, U.S. Pat. No. 5,547,776 discloses an electrochemical fuel cell having an oxygen-containing gas/coolant flow field plate 1 as shown in FIG. 10. The plate 1 has an oxygen-containing gas supply passage 2a and an oxygen-containing gas discharge passage 2b at two diagonal corners, and a fuel gas supply passage 3a, a coolant discharge passage 4b, a fuel gas discharge passage 3b, and a coolant supply passage 4a at the other two diagonal corners.

An oxygen-containing gas flow field 5 comprising a plurality of grooves in a serpentine pattern is formed on one surface of the plate 1, along the power generation reaction area. The oxygen-containing gas flow field 5 is connected to the oxygen-containing gas supply passage 2a and the oxygen-containing gas discharge passage 2b.

A coolant flow field (not shown) is formed on the other surface of the plate 1. The coolant flow field is connected to the coolant supply passage 4a and the coolant discharge passage 4b. As with the oxygen-containing gas flow field 5, the coolant flow field comprises a plurality of grooves in a serpentine pattern. In the coolant flow field, the temperature is the lowest at a position corresponding to the area of the oxygen-containing gas flow field 5 where the amount of water is the smallest, while the temperature is highest at a position corresponding to the oxygen-containing gas flow field 5 where the amount of water is the largest.

However, in the conventional technique, the oxygen-containing gas flow field 5 and the coolant flow field are formed on both surfaces of the plate 1. The flow grooves of the oxygen-containing gas flow field 5 and the flow grooves of the coolant flow field have substantially the same shape in the serpentine pattern, for example. Thus, the shape of the oxygen-containing gas flow field 5 and the shape of the coolant flow field need to be substantially the same.

That is, the shapes of the flow fields cannot be designed freely. For example, grooves of reactant gas flow fields (e.g., the oxygen-containing gas flow field 5) cannot be formed in substantially perpendicular to the grooves of the coolant flow field. In such a structure, the fuel cell cannot be used in a variety of applications.

SUMMARY OF THE INVENTION

A main object of the present invention is to provide a fuel cell having a simple structure in which the flow direction of a reactant gas is substantially perpendicular to the flow direction of a coolant, and uniform temperature distribution in electrode surfaces of the fuel cell is achieved.

The present invention relates to a fuel cell formed by stacking electrolyte electrode assemblies and separators alternately in a horizontal direction. Each of the electrolyte electrode assemblies includes a pair of electrodes with an electrolyte interposed between the electrodes. A reactant gas flow field for supplying a reactant gas is formed between the electrode electrolyte assembly and one of separators sandwiching the electrolyte electrode assembly for supplying a reactant gas along a surface of the electrode, and a coolant flow field is formed between adjacent separators which are stacked together for allowing a coolant to flow in a direction substantially perpendicular to the flow direction of the reactant gas.

According to an aspect of the present invention, a coolant connection channel extending in the width direction substantially perpendicular to the flow direction of the coolant in the coolant flow field is provided. The coolant connection channel is connected to the coolant flow field, and formed to pass through the fuel cell in the stacking direction. In the coolant connection channel, the flow rate of the coolant supplied to an area near an outlet of the reactant gas flow field is smaller than the flow rate of the coolant supplied to the other area.

Further, according to another aspect of the present invention, a coolant connection channel extending in the width direction substantially perpendicular to the flow direction of the coolant in the coolant flow field is provided. The coolant connection channel is connected to the coolant flow field, and formed to pass through the fuel cell in the stacking direction. In the coolant connection channel, the flow rate of the coolant supplied to an area near an inlet of the reactant gas flow field is larger than the flow rate of the coolant supplied to the other area.

Further, according to still another aspect of the present invention, a coolant connection channel extending in the width direction substantially perpendicular to the flow direction of the coolant in the coolant flow field is provided. The coolant connection channel is connected to the coolant flow field, and formed to pass through the fuel cell in the stacking direction. In the coolant connection channel, the flow rate of the coolant supplied to an area near an outlet of the reactant gas flow field is smaller than the flow rate of the coolant supplied to the other area, and the flow rate of the coolant supplied to an area near an inlet of the reactant gas flow field is larger than the flow rate of the coolant supplied to the other area.

Further, according to the present invention, the coolant connection channel includes coolant passages extending though the fuel cell in the stacking direction. Preferably, the cross sectional areas of openings of the coolant passages are different depending on the position in the width direction. Further, preferably, the coolant connection channel includes connection grooves connected to the coolant flow field, and intervals of the connection grooves are different depending on the position in the width direction.

Further, preferably, the reactant gas flow field is expanded from an area near an inlet of the coolant passage having a large opening in cross section, toward an area near an outlet of the coolant passage having a small opening in cross section, and in the area near the outlet, the number of grooves of the reactant gas flow field is large in comparison with the other area.

Further, preferably, a reactant gas supply passage and a reactant gas discharge passage connected to the reactant gas flow field extend through the fuel cell in the stacking direction, the coolant connection channel includes a coolant supply passage and a coolant discharge passage, and the reactant gas supply passage and the reactant gas discharge passage are provided on the left and right sides of the separator and the coolant supply passage and the coolant discharge passage are provided on the upper and lower sides of the separator, or the reactant gas supply passage and the reactant gas discharge passage are provided on the upper and lower sides of the separator and the coolant supply passage and the coolant discharge passage are provided on the left and right sides of the separator.

According to the present invention, in the coolant connection channel, the flow rate of the coolant supplied to the area near the outlet of the reactant gas flow field is smaller than the flow rate of the coolant supplied to the other area. Therefore, in the reactant gas flow field, the temperature in the area near the outlet is relatively high. Thus, the reactant gas is warmed in the area near the outlet of the reactant gas flow field. The condensed water or the like in the reactant gas flow field is vaporized, and mixed into the reactant gas. Consequently, the condensed water is not retained in the reactant gas flow field. The water is discharged reliably, and the desired power generation can be performed.

Further, according to the present invention, in the coolant connection channel, the flow rate of the coolant supplied to the area near the inlet of the reactant gas flow field is larger than the flow rate of the coolant supplied to the other area. Therefore, in the reactant gas flow field, a large amount of coolant is supplied to the area near the inlet of the reactant gas flow field. Accordingly, it is possible to reliably cool the area near the inlet of the reactant gas flow field where the power generation reaction occurs actively, and it is possible to suppress the increase in the temperature of the electrodes. Accordingly, the increase in the electrical resistance is suppressed effectively, and the power generation is performed efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
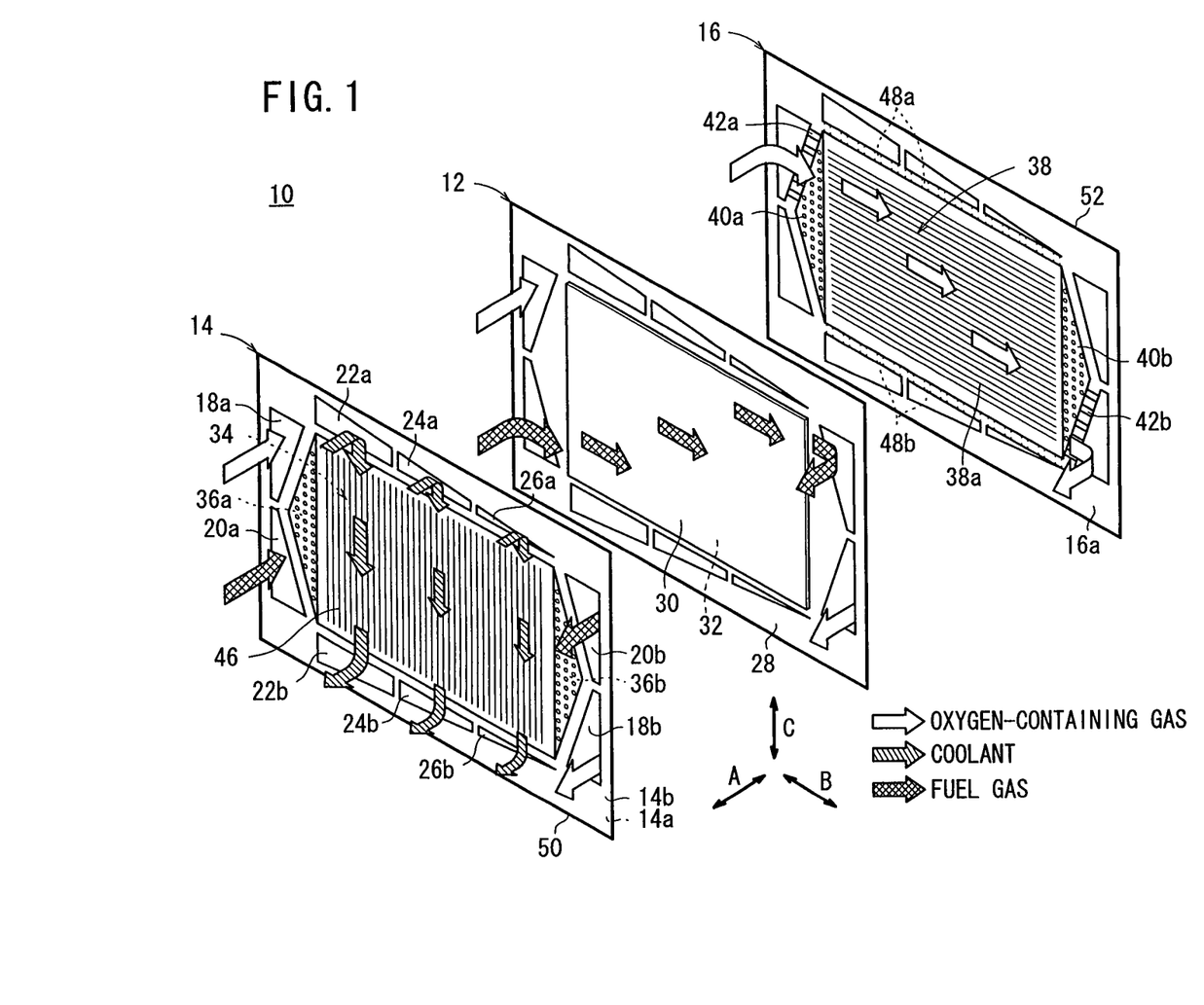
FIG. 1 is an exploded perspective view showing main components of a fuel cell according to a first embodiment of the present invention.

FIG. 1 is an exploded perspective view showing main components of a fuel cell 10 according to a first embodiment of the present invention. In general, a plurality of the fuel cells 10 are stacked together in a horizontal direction to form a fuel cell stack.

Each of the fuel cells 10 includes a membrane electrode assembly (electrolyte electrode assembly) 12 and an anode side metal separator 14 and a cathode side metal separator 16 sandwiching the membrane electrode assembly 12. For example, the anode side metal separator 14 and the cathode side metal separator 16 are steel plates, stainless steel plates, aluminum plates, or plated steel sheets. The anode side metal separator 14 and the cathode side metal separator 16 may be made of metal plates having anti-corrosive surfaces formed by surface treatment.

At one end of the fuel cell 10 in a longitudinal direction indicated by an arrow B in FIG. 1, an oxygen-containing gas supply passage 18a for supplying an oxygen-containing gas, and a fuel gas supply passage 20a for supplying a fuel gas such as a hydrogen-containing gas are provided. The oxygen-containing gas supply passage 18a and the fuel gas supply passage 20a extend through the fuel cell 10 in the direction indicated by the arrow A.

At the other end of the fuel cell 10 in the longitudinal direction, a fuel gas discharge passage 20b for discharging the fuel gas and an oxygen-containing gas discharge passage 18b for discharging the oxygen-containing gas are provided. The fuel gas discharge passage 20b and the oxygen-containing gas discharge passage 18b extend through the fuel cell 10 in the direction indicated by the arrow A. The oxygen-containing gas supply passage 18a, the oxygen-containing gas discharge passage 18b, the fuel gas supply passage 20a, and the fuel gas discharge passage 20b have openings each having a trapezoidal shape in cross section corresponding to the shape of buffers 36a, 36b as described later.

At an upper end of the fuel cell 10, for example, three coolant supply passages 22a, 24a, and 26a for supplying a coolant are provided. At a lower end of the fuel cell 10, for example, three coolant discharge passages 22b, 24b, and 26b for discharging the coolant are provided.

Openings of the coolant supply passages 22a, 24a, and 26a form a substantially right triangular shape in cross section as a whole. The flow rates of the coolant supplied to an area near the outlets of an oxygen-containing gas flow field 38 and a fuel gas flow field 34 as described later, i.e., near the oxygen-containing gas discharge passage 18b and the fuel gas discharge passage 20b is smaller than the flow rate of the coolant supplied to an area near the inlets of the oxygen-containing gas flow field 38 and the fuel gas flow field 34 (reactant gas flow fields), i.e., near the oxygen-containing gas supply passage 18a and the fuel gas supply passage 20a. The flow rate of the coolant supplied to an area near the oxygen-containing gas supply passage 18a and the fuel gas supply passage 20a are larger than the flow rate of the coolant supplied to the other area.

Specifically, among the coolant supply passages 22a, 24a, and 26a, the opening of the coolant supply passage 22a has the largest cross sectional area, the opening of the coolant supply passage 26a has the smallest cross sectional area, and the opening of the coolant supply passage 24a has the cross sectional area which is smaller than that of the coolant supply passage 22a, and larger than that of the coolant supply passage 26a. Also in the case of the coolant discharge passages 22b, 24b, and 26b, openings of these coolant discharge passages 22b, 24b, and 26b form a substantially right triangular shape as a whole. The opening of the coolant discharge passage 22b has the largest cross sectional area, the opening of the coolant discharge passage 26b has the smallest cross sectional area, and the opening of the coolant discharge passage 24b has the cross sectional area which is smaller than that of the coolant discharge passage 22b, and larger than that of the coolant discharge passage 26b.

The membrane electrode assembly 12 includes an anode 30, a cathode 32, and a solid polymer electrolyte membrane (electrolyte) 28 interposed between the anode 30 and the cathode 32. The solid polymer electrolyte membrane 28 is formed by impregnating a thin membrane of perfluorosulfonic acid with water, for example.

Each of the anode 30 and the cathode 32 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 30 and the electrode catalyst layer of the cathode 32 are fixed to both surfaces of the solid polymer electrolyte membrane 28, respectively.

Figure 2:
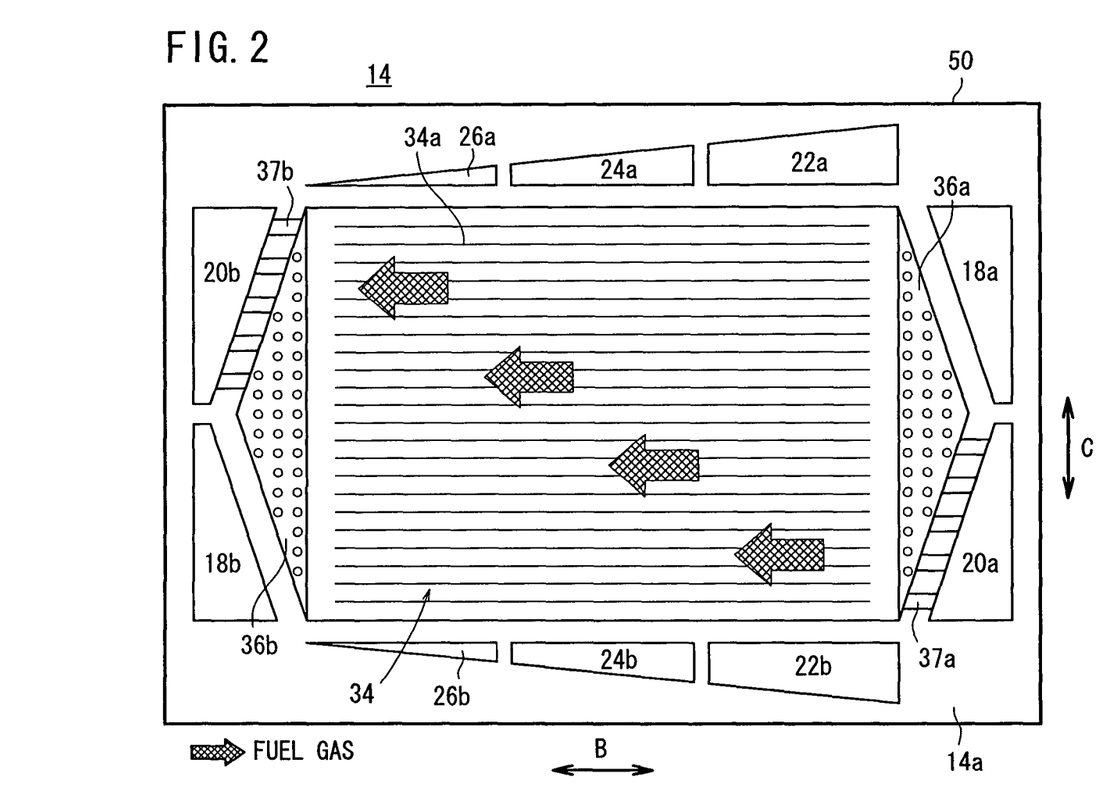
FIG. 2 is a front view showing an anode side metal separator of the fuel cell.

As shown in FIGS. 1 and 2, the anode side metal separator 14 has a fuel gas flow field (reactant gas flow field) 34 on its surface 14a facing the membrane electrode assembly 12. The fuel gas flow field (reactant gas flow field) 34 is connected to the fuel gas supply passage 20a and the fuel gas discharge passage 20b. The fuel gas flow field 34 includes a plurality of flow grooves 34a extending in the direction indicated by the arrow B, and a plurality of buffers 36a, 36b are provided at opposite ends of the flow grooves 34a in the direction indicated by the arrow B.

Each of the buffers 36a, 36b has a substantially triangular shape. Bosses are formed in the buffers 36a, 36b. The fuel gas supply passage 20a is connected to the buffer 36a through a plurality of inlet connection grooves 37a, and the fuel gas discharge passage 20b is connected to the buffer 36b through a plurality of outlet connection grooves 37b.

As shown in FIG. 1, the cathode side metal separator 16 has an oxygen-containing gas flow field (reactant gas flow field) 38 on its surface 16a facing the membrane electrode assembly 12. The oxygen-containing gas flow field 38 is connected to the oxygen-containing gas supply passage 18a and the oxygen-containing gas discharge passage 18b.

As with the fuel gas flow field 34, the oxygen-containing gas flow field 38 includes a plurality of flow grooves 38a extending in the direction indicated by the arrow B, and substantially triangular buffers 40a, 40b are provided at opposite ends of the flow grooves 38a in the direction indicated by the arrow B. The oxygen-containing gas supply passage 18a is connected to the buffer 40a through a plurality of inlet connection grooves 42a, and the oxygen-containing gas discharge passage 18b and the buffer 40b are connected through a plurality of outlet connection grooves 42b.

Figure 3:
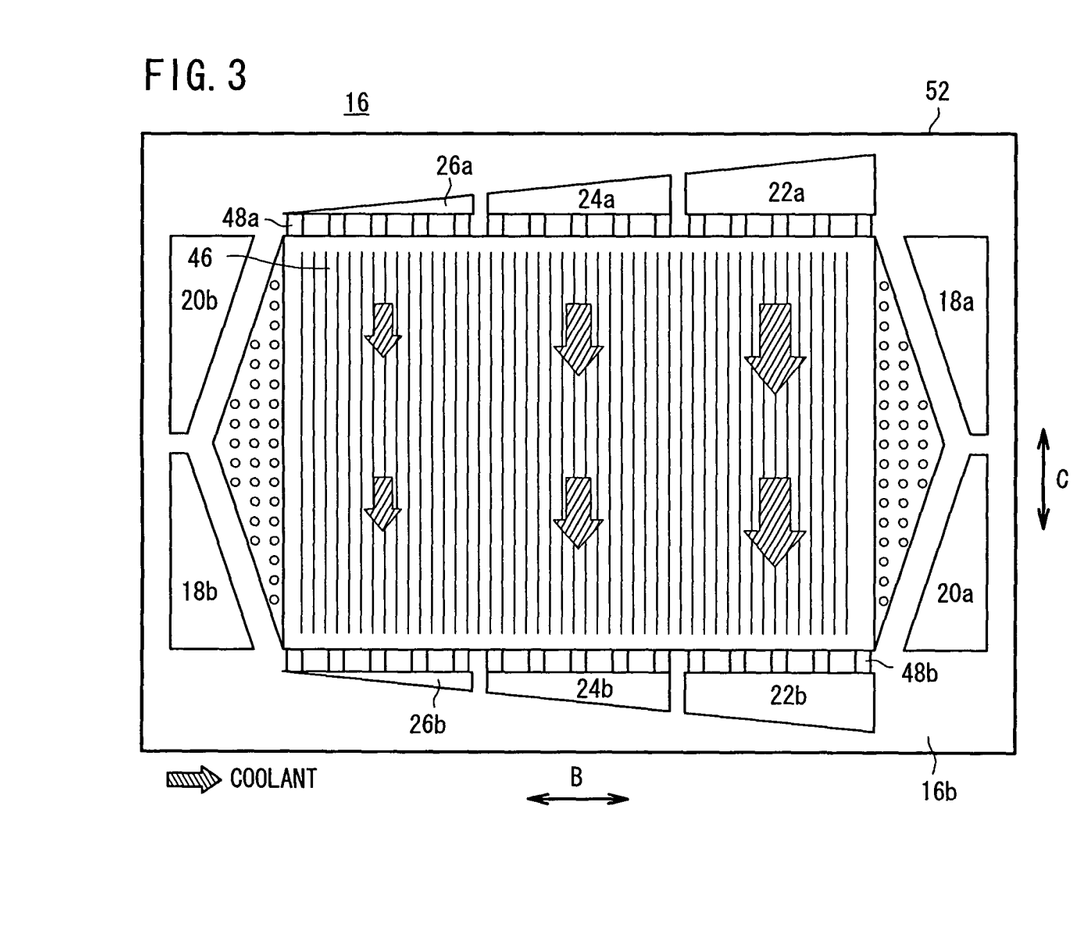
FIG. 3 is a front view showing a cathode side metal separator of the fuel cell.

As shown in FIGS. 1 and 3, a coolant flow field 46 is formed between a surface 14b of the anode side metal separator 14 and a surface 16b of the cathode side metal separator 16. The coolant flow field 46 is connected to the coolant supply passages 22a, 24a, and 26a and the coolant discharge passages 22b, 24b, and 26b. The coolant flow field 46 is formed when the back surface of the fuel gas flow field 34 and the back surface of the oxygen-containing gas flow field 38 are stacked together, and includes flow grooves extending in the direction indicated by the arrow C. It is preferable that the flow grooves 34a, 38a have a zigzag pattern out of phase with each other, for example.

As shown in FIG. 3, the cathode side metal separator 16 has a plurality of inlet connection grooves 48a connecting the coolant supply passages 22a, 24a, and 26a and the coolant flow field 46, and a plurality of outlet connection grooves 48b connecting the coolant discharge passages 22b, 24b, and 26b and the coolant flow field 46. The coolant supply passages 22a, 24a, and 26a and the inlet connection grooves 48a, and the coolant discharge passages 22b, 24b, and 26b and the outlet connection grooves 48b form a coolant connection channel.

A first seal member 50 is formed integrally on the surfaces 14a, 14b of the anode side metal separator 14 around the outer end of the anode side metal separator 14 (see FIG. 1). A second seal member 52 is formed integrally on the surfaces 16a, 16b of the cathode side metal separator 16 around the outer end of the cathode side metal separator 16.

Operation of the fuel cell 10 will be described below.

Firstly, as shown in FIG. 1, an oxygen-containing gas is supplied to an oxygen-containing gas supply passage 18a, and a fuel gas such as a hydrogen-containing gas is supplied to the fuel gas supply passage 20a. Further, a coolant such as pure water, ethylene glycol, or oil is supplied to the coolant supply passages 22a, 24a, and 26a.

Thus, the oxygen-containing gas flows through the oxygen-containing gas supply passage 18a, and flows from the buffer 40a to the oxygen-containing gas flow field 38 of the cathode side metal separator 16. The oxygen-containing gas flows in the direction indicated by the arrow B, and flows along the cathode 32 of the membrane electrode assembly 12 for inducing an electrochemical reaction at the cathode 32. The fuel gas flows through the fuel gas supply passage 20a, and flows from the buffer 36a to the fuel gas flow field 34 of the anode side metal separator 14 (see FIG. 2). The fuel gas flows through the fuel gas flow field 34 in the direction indicated by the arrow B along the anode 30 of the membrane electrode assembly 12 for inducing an electrochemical reaction at the anode 30.

Thus, in each of the membrane electrode assemblies 12, the oxygen-containing gas supplied to the cathode 32, and the fuel gas supplied to the anode 30 are consumed in the electrochemical reactions at catalyst layers of the cathode 32 and the anode 30 for generating electricity.

Then, the oxygen-containing gas consumed at the cathode 32 flows through the buffer 40b, and is discharged into the oxygen-containing gas discharge passage 18b. The oxygen-containing gas flows through the oxygen-containing gas discharge passage 18b in the direction indicated by the arrow A. Likewise, the fuel gas consumed at the anode 30 flows through the buffer 36b, and is discharged into the fuel gas discharge passage 20b. The fuel gas flows through the fuel gas discharge passage 20b in the direction indicated by the arrow A.

Further, the coolant supplied to the coolant supply passages 22a, 24a, and 26a flows into the coolant flow field 46 formed between the anode side metal separator 14 and the cathode side metal separator 16, and flows in the direction indicated by the arrow C (see FIG. 3). After the coolant cools the membrane electrode assembly 12, the coolant is discharged into the coolant discharge passages 22b, 24b, and 26b.

In the first embodiment, the fuel gas in the fuel gas flow field 34 and the oxygen-containing gas in the oxygen-containing gas flow field 38 flow in the direction indicated by the arrow B, and the coolant in the coolant flow field 46 flows is the direction indicated by the arrow C which is perpendicular to the direction indicated by the arrow B. Among the coolant supply passages 22a, 24a, and 26a and the coolant discharge passages 22b, 24b, and 26b, the cross sectional areas of the openings of the coolant supply passage 26a and the coolant discharge passage 26b are smaller than those of the coolant supply passages 22a, 24a and the coolant discharge passages 22b, 24b.

Thus, as shown in FIGS. 1 and 3, the flow rate of the coolant supplied to the area near the outlets of the fuel gas flow field 34 and the oxygen-containing gas flow field 38 is smaller than the flow rate of the coolant supplied to the other area. In such a structure, it is possible to prevent the temperatures of the fuel gas and the oxygen-containing gas near the outlets of the fuel gas flow field 34 and the oxygen-containing gas flow field 38 from decreasing.

Since the fuel gas and the oxygen-containing gas near the outlets are warmed, and the temperatures of the fuel gas and the oxygen-containing gas are increased, the condensed water or the like in the fuel gas flow field 34 and the oxygen-containing gas flow field 38 is vaporized, mixed into the fuel gas and the oxygen-containing gas, and discharged into the fuel gas discharge passage 20b and the oxygen-containing gas discharge passage 18b. Thus, it is possible to prevent the condensed water from being retained in the fuel gas flow field 34 and the oxygen-containing gas flow field 38. Accordingly, the water is discharged reliably, and the desired power generation is performed.

Further, in the first embodiment, the cross sectional areas of the openings of the coolant supply passage 22a and the coolant discharge passage 22b are larger than those of the coolant supply passages 24a, 26a and the coolant discharge passages 24b, 26b. Thus, the flow rate of the coolant supplied to the area near the inlets of the fuel gas flow field 34 and the oxygen-containing gas flow field 38 are larger than the flow rate of the coolant supplied to the other area. In such a structure, a large amount of the coolant is supplied to the area near the inlets of the fuel of the fuel gas flow field 34 and the oxygen-containing gas flow field 38.

In particular, it is possible to suitably cool the area near the inlets of the fuel gas flow field 34 and the oxygen-containing gas flow field 38 where the power generation reaction occurs actively, and it is possible to suppress the increase in the temperature of the membrane electrode assembly 12. Accordingly, the increase in the electrical resistance of the membrane electrode assembly 12 is suppressed effectively, and the power generation is performed efficiently.

Figure 4:
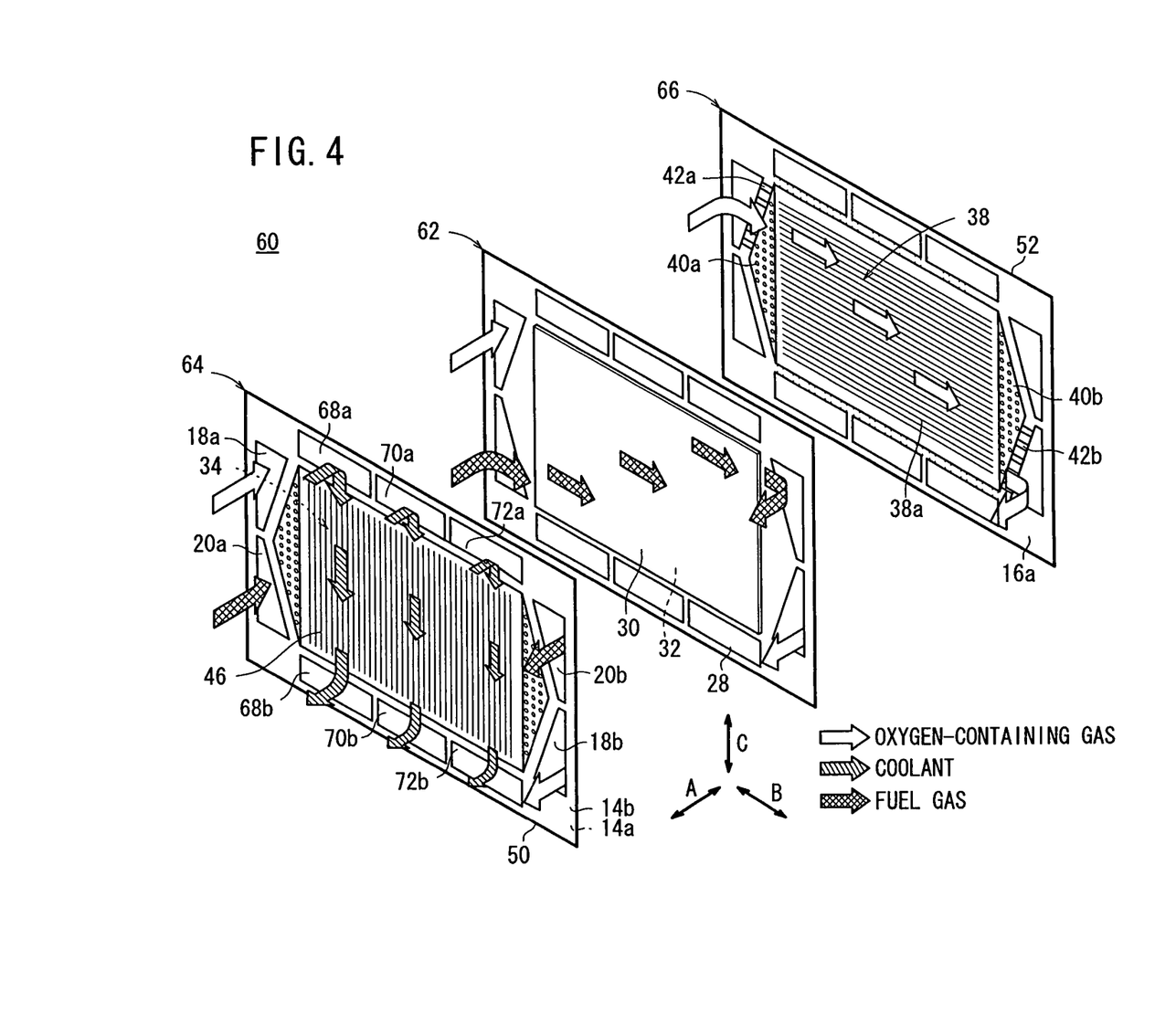
FIG. 4 is an exploded perspective view showing a fuel cell according to a second embodiment of the present invention.

FIG. 4 is an exploded perspective view showing main components of a fuel cell 60 according to a second embodiment of the present invention. The constituent elements of the fuel cell 60 according to the second embodiment that are identical to those of the fuel cell 10 according to the first embodiment are labeled with the same reference numeral, and description thereof will be omitted. Likewise, the constituent elements of the fuel cell according to third to six embodiments as described later that are identical to those of the fuel cell 10 according to the first embodiment are labeled with the same reference numeral, and description thereof will be omitted.

The fuel cell 60 includes a membrane electrode assembly (electrolyte electrode assembly) 62 and an anode side metal separator 64 and a cathode side metal separator 66 sandwiching the membrane electrode assembly 62. At an upper end of the fuel cell 60, three coolant supply passages 68a, 70a, and 72a for supplying a coolant are provided. At a lower end of the fuel cell 60, three coolant discharge passages 68b, 70b, and 72b for discharging the coolant are provided.

Each of the coolant supply passages 68a, 70a, and 72a has a substantially rectangular shape, and the cross sectional areas of openings of the coolant supply passages 68a, 70a, and 72a are substantially the same. Likewise, each of the coolant discharge passages 68b, 70b, and 72b has a substantially rectangular shape, and the cross sectional areas of openings of the coolant discharge passages 68b, 70b, and 72b are substantially the same.

Figure 5:
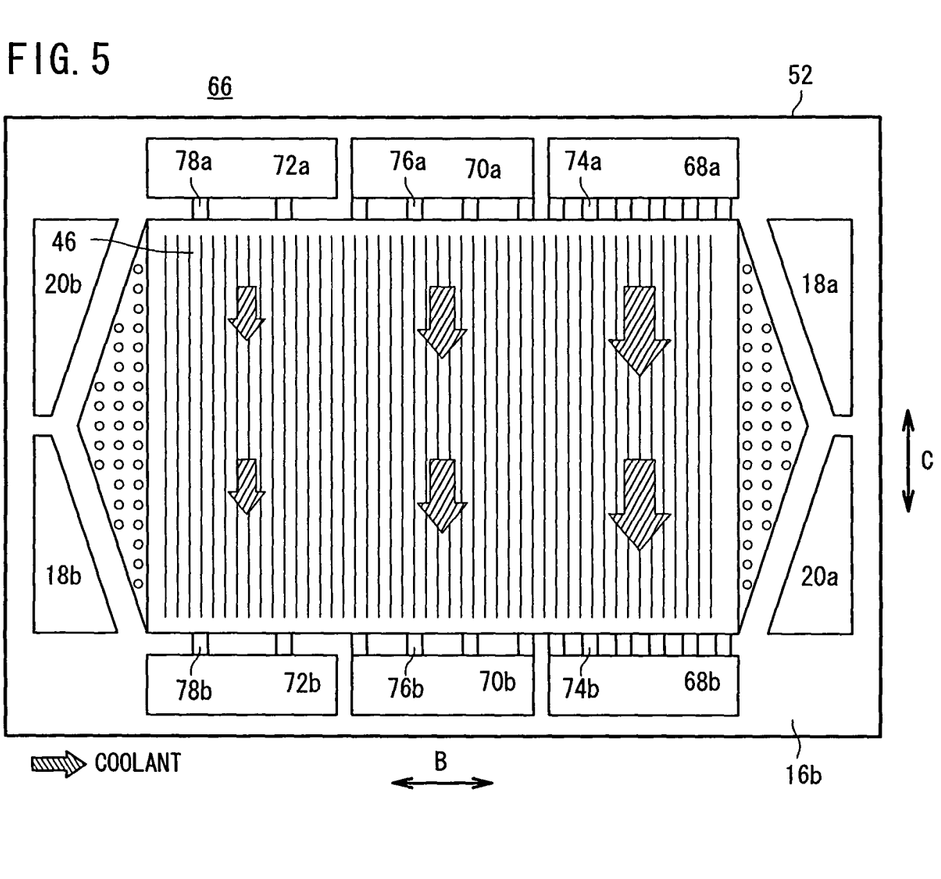
FIG. 5 is a front view showing a cathode side metal separator of the fuel cell.

As shown in FIG. 5, a plurality of inlet connection grooves 74a, 76a, and 78a, and a plurality of outlet connection grooves 74b, 76b, and 78b are provided on the surface 16b of the cathode side metal separator 66. The inlet connection grooves 74a, 76a, and 78a are connected to the coolant supply passages 68a, 70a, and 72a, and the coolant flow field 46. The outlet connection grooves 74b, 76b, and 78b are connected to the coolant discharge passages 68b, 70b, and 72b, and the coolant flow field 46. The inlet connection grooves 74a, 76a, and 78a, and the outlet connection grooves 74b, 76b, and 78b form a coolant connection channel.

Among the inlet connection grooves 74a, 76a, and 78a, the number of the inlet connection grooves 74a is the largest, i.e., the intervals between the inlet connection grooves 74a in the width direction indicated by the arrow B are the smallest, and the number of the inlet connection grooves 78a is the smallest, i.e., the intervals of the inlet connection grooves 78a in the width direction indicated by the arrow B are the largest. Likewise, among the outlet connection grooves 74b, 76b, and 78b, the number of the outlet connection grooves 74b is the largest, and the number of the outlet connection grooves 78b is the smallest.

In the second embodiment, the number of the inlet connection grooves 78a connected to the coolant supply passage 72a is the smallest, and the number of the outlet connection grooves 78b connected to the coolant discharge passage 72b is the smallest. Therefore, the flow rate of the coolant supplied to an area near the outlets of the fuel gas flow field 34 and the oxygen-containing gas flow field 38 is smaller than the flow rate of the coolant supplied to the other area.

Further, the number of the inlet connection grooves 74a connected to the coolant supply passage 68a is the largest, and the number of the outlet connection grooves 74b connected to the coolant discharge passage 68b is the largest. The flow rate of the coolant supplied to an area near the inlets of the fuel gas flow field 34 and the oxygen-containing gas flow field 38 is larger than the flow rate of the coolant supplied to the other area. Thus, the same advantages as in the case of the first embodiment can be obtained. For example, it is possible to prevent the condensed water from being retained in the fuel gas flow field 34 and the oxygen-containing gas flow field 38, and it is possible to reduce the electrical resistance of the membrane electrode assembly 62.

Figure 6:
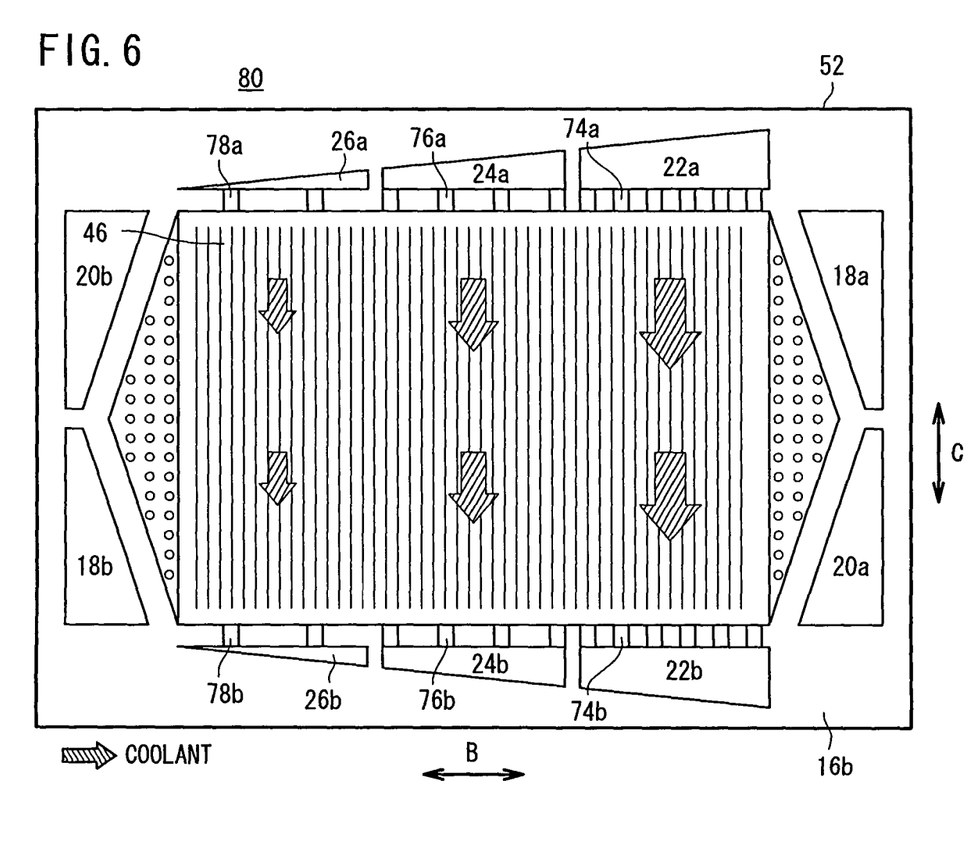
FIG. 6 is a front view showing a cathode side metal separator according to a third embodiment of the present invention.

FIG. 6 is a front view showing a cathode side metal separator 80 of a fuel cell according to a third embodiment of the present invention.

In effect, the cathode side metal separator 80 has the structure corresponding to combination of the first and second embodiments. The coolant connection channel includes the coolant supply passages 22a, 24a, 26a and the coolant discharge passages 22b, 24b, and 26b. The cross sectional areas of the openings of the coolant supply passages 22a, 24a, 26a, and the coolant discharge passages 22b, 24b, and 26b are different depending on the position in the width direction. Further, the coolant connection channel includes the inlet connection grooves 74a, 76a, and 78a, and the outlet connection grooves 74b, 76b, and 78b. The intervals of the inlet connection grooves 74a, 76a, and 78a, and the outlet connection grooves 74b, 76b, and 78b are different depending on the position in the width direction.

Thus, in the third embodiment, the same advantages as in the cases of the first and second embodiments can be obtained. Further, it is possible to achieve the uniform flow distribution of the coolant in the coolant flow field 46 even more reliably.

Figure 7:
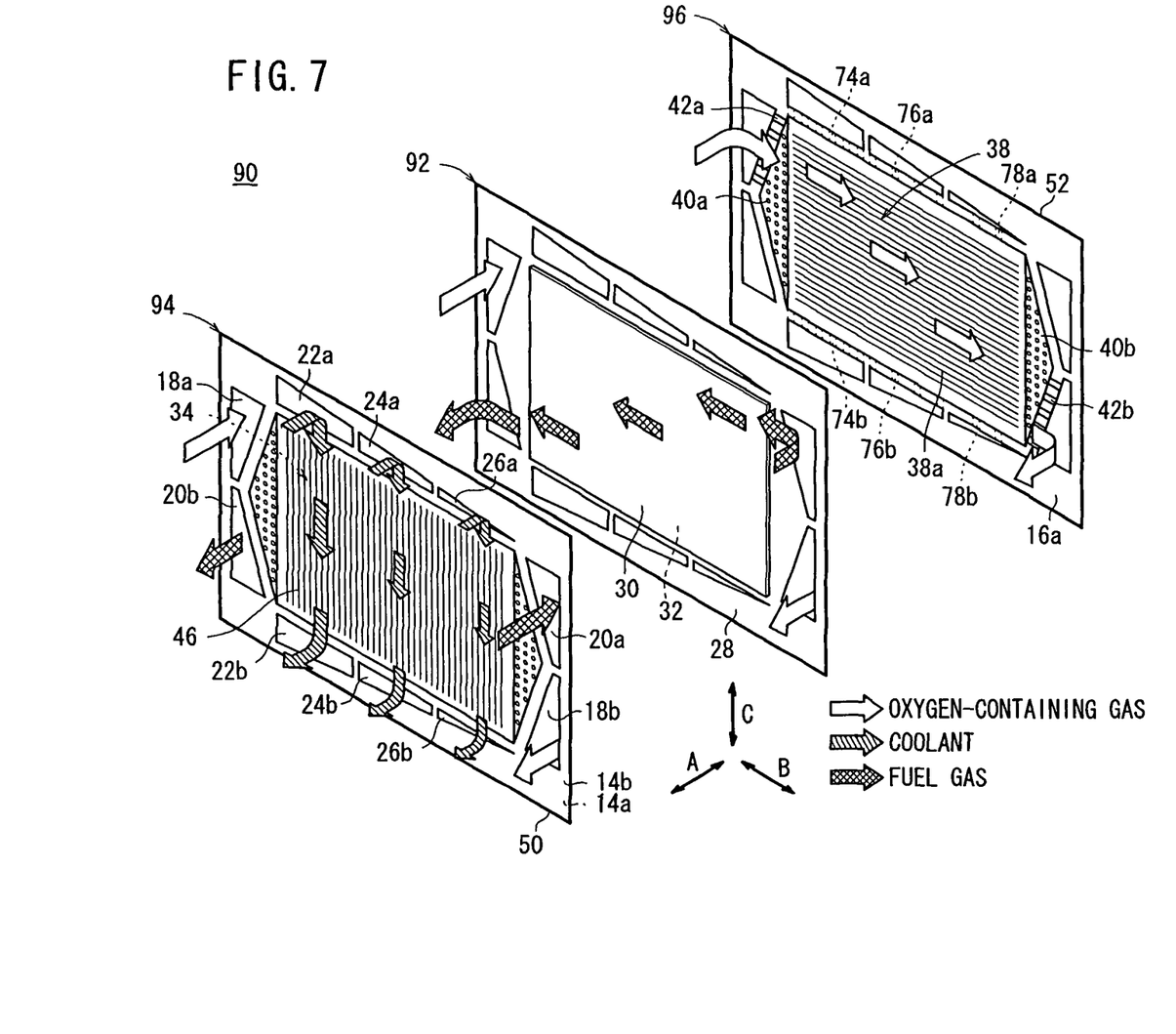
FIG. 7 is an exploded perspective view showing main components of a fuel cell according to a fourth embodiment of the present invention.

FIG. 7 is an exploded perspective view showing main components of a fuel cell 90 according to a fourth embodiment of the present invention.

The fuel cell 90 includes a membrane electrode assembly (electrolyte electrode assembly) 92 and an anode side metal separator 94 and a cathode side metal separator 96 sandwiching the membrane electrode assembly 92. At one end of the fuel cell 90 in a direction indicated by the arrow B, an oxygen-containing gas supply passage 18a and a fuel gas discharge passage 20b are provided. At the other end of the fuel cell 90 in the direction indicated by the arrow B, a fuel gas supply passage 20a and an oxygen-containing gas discharge passage 18b are provided.

For example, as in the case of the third embodiment, coolant supply passages 22a, 24a, and 26a are connected to a coolant flow field 46 through inlet connection grooves 74a, 76a, and 78a. Further, coolant discharge passages 22b, 24b, and 26b are connected to the coolant flow field 46 through outlet connection grooves 74b, 76b, and 78b.

In the fourth embodiment, the flow rate of the coolant supplied to an area near the outlet of the oxygen-containing gas flow field 38 is smaller than the flow rate of the coolant supplied to the other area, and the flow rate of the coolant supplied to an area near the inlet of the oxygen-containing gas flow field 38 is larger than the flow rate of the coolant supplied to the other area.

In general, on the upstream side of the oxygen-containing gas flow field 38, the reaction occurs actively, and it is likely that concentration of the oxygen-containing gas is decreased in comparison with the fuel gas. Thus, the heat generation amount on the upstream side of the oxygen-containing gas flow field 38 is large. On the downstream side of the oxygen-containing gas flow field 38, the power generation performance is lowered, and water condensation occurs easily.

In view of the above, by reducing the flow rate of the coolant supplied to the area corresponding to the downstream side of the oxygen-containing gas flow field 38, the condensed water is vaporized, and discharged desirably from the oxygen-containing gas flow field 38. Further, by increasing the flow rate of the coolant supplied to the area corresponding to the upstream side of the oxygen-containing gas flow field 38, it is possible to suppress the increase in temperature effectively, and reduce the electrical resistance.

Thus, in the fourth embodiment, the power generation performance in the area extending from the midstream side to the downstream side of the oxygen-containing gas flow field 38 is improved, and the reaction area of the oxygen-containing gas flow field 38 is increased as a whole. Local reaction is suppressed, and it is possible to prevent local degradation of the membrane electrode assembly 92.

Figure 8:
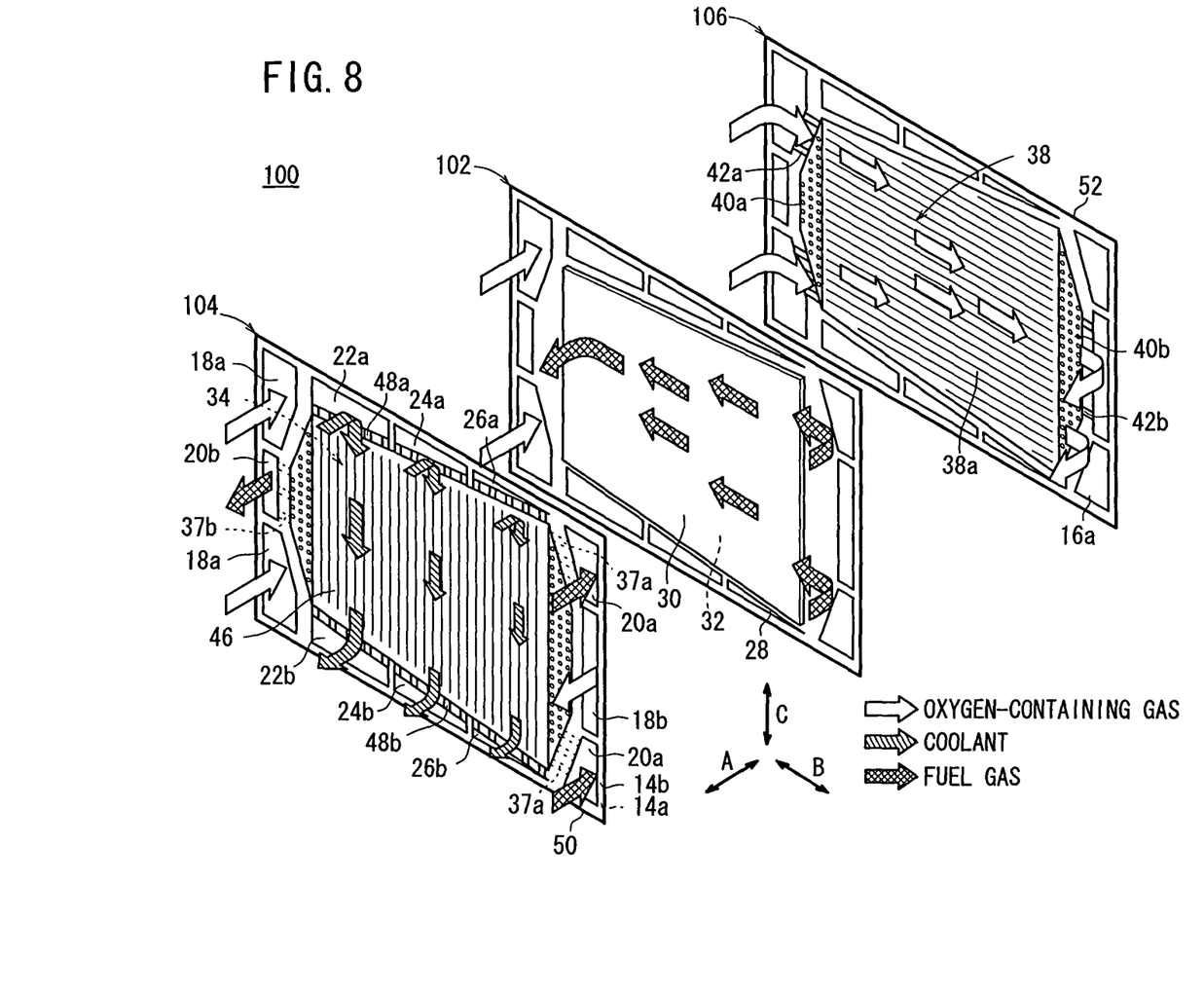
FIG. 8 is an exploded perspective view showing main components of a fuel cell according to a fifth embodiment of the present invention.

FIG. 8 is an exploded perspective view showing a fuel cell 100 according to a fifth embodiment of the present invention.

The fuel cell 100 includes a membrane electrode assembly (electrolyte electrode assembly) 102 and an anode side metal separator 104 and a cathode side metal separator 106 sandwiching the membrane electrode assembly 102. At one end of the fuel cell 100 in a direction indicated by an arrow B, a fuel gas discharge passage 20b and two oxygen-containing gas supply passages 18a are arranged in a direction indicated by an arrow C. The fuel gas discharge passage 20b is positioned between the oxygen-containing gas supply passages 18a. At the other end of the fuel cell 100 in the direction indicated by the arrow B, an oxygen-containing gas discharge passage 18b and two fuel gas supply passages 20a are arranged in the direction indicated by the arrow C. The oxygen-containing gas discharge passage 18b is positioned between the fuel gas supply passages 20a.

The fuel gas flow field 34 and the oxygen-containing gas flow field 38 have substantially trapezoidal shapes, corresponding to inclinations of coolant supply passages 22a, 24a, and 26a and coolant discharge passages 22b, 24b, and 26b. The oxygen-containing gas flow field 38 is expanded toward the outlet side. The number of grooves of the oxygen-containing gas flow field 38 is large in the area near the outlet of the oxygen-containing gas flow field 38.

The anode 30 and the cathode 32 of the membrane electrode assembly 12 have substantially trapezoidal shapes, corresponding to the shapes of the fuel gas flow field 34 and the oxygen-containing gas flow field 38.

For example, inlet connection grooves 48a connecting the coolant flow field 46 to the coolant supply passages 22a, 24a, and 26a and outlet connection grooves 48b connecting the coolant flow field 46 to the coolant discharge passages 22b, 24b, and 26b may be provided on the anode side metal separator 104. The inlet connection grooves 48a and the outlet connection grooves 48b may be provided on the cathode side metal separator 106.

In the fifth embodiment, the flow rate of the coolant supplied to an area corresponding to the downstream side of the oxygen-containing gas flow field 38 is smaller than the flow rate of the coolant supplied to the other area. The flow rate of the coolant supplied to an area corresponding to the upstream side of the oxygen-containing gas flow field 38 is larger than the flow rate of the coolant supplied to the other area. Thus, the same advantages as in the case of the first to fourth embodiments can be obtained.

Further, since the fuel gas flow field 34 and the oxygen-containing gas flow field 38 have the substantially trapezoidal shapes, the anode 30 and the cathode 32 have the substantially trapezoidal shapes. That is, the power generation areas of the anode 30 and the cathode 32 are large. Thus, in the fifth embodiment, the efficient power generation is carried out easily.

In the first to fifth embodiments, the coolant flows downwardly in the direction indicated by the arrow C (in the direction of gravity) along the coolant flow field 46. However, the present invention is not limited in this respect. For example, in a fuel cell 110 according to a sixth embodiment shown in FIG. 9, coolant supply passages 22a, 24a, and 26a are provided on one side of the fuel cell 110 in a horizontal direction, and coolant discharge passages 22b, 24b, 26b are provided on the other side of the fuel cell 110 in the horizontal direction.

Figure 9:
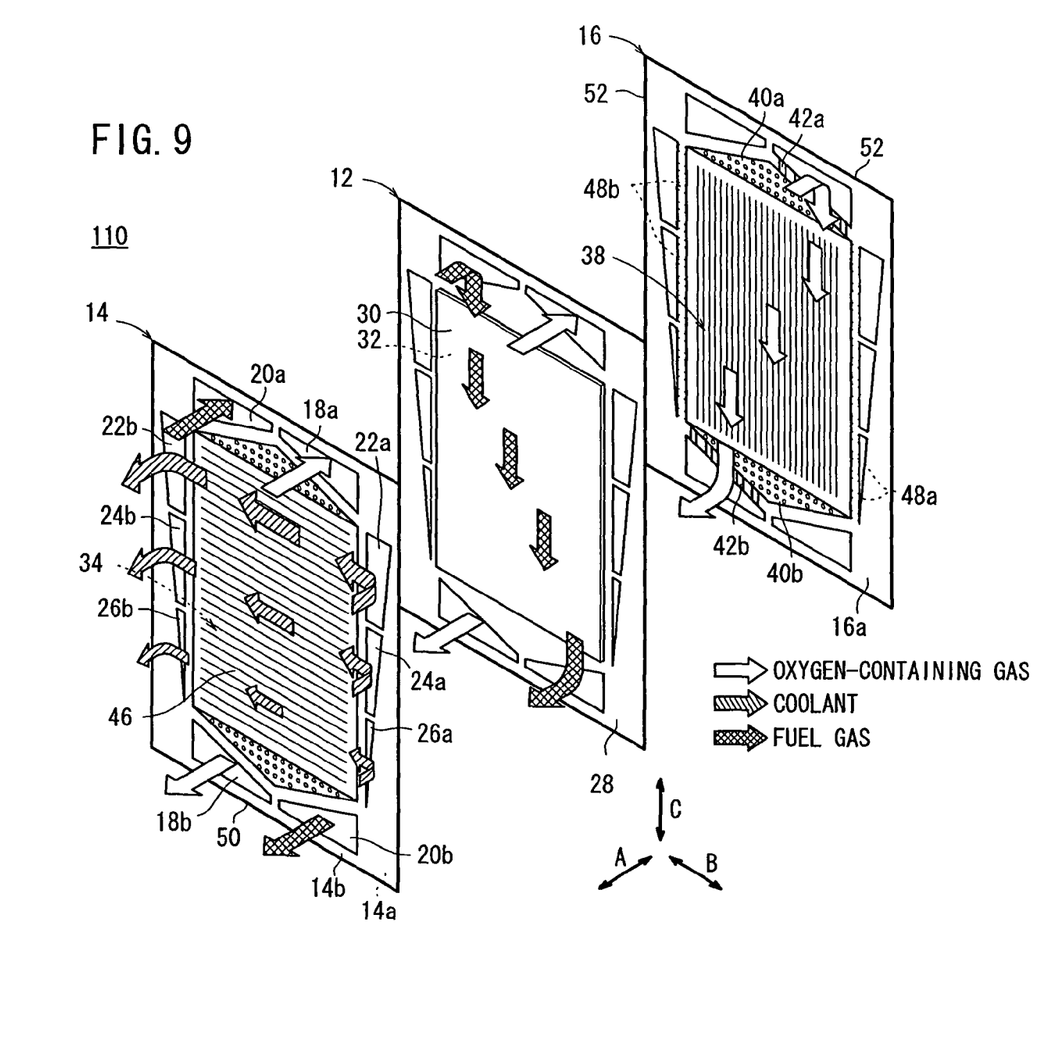
FIG. 9 is an exploded perspective view showing main components of a fuel cell according to a sixth embodiment of the present invention.

At an upper end of the fuel cell 110 in the vertical direction, an oxygen-containing gas supply passage 18a and a fuel gas supply passage 20a are provided. At a lower end of the fuel cell 110 in the vertical direction, an oxygen-containing gas discharge passage 18b and a fuel gas discharge passage 20b are provided.

In the fuel cell 110, the coolant is supplied in the horizontal direction along the coolant flow field 46. The flow rate of the coolant supplied to an area near the outlets of the fuel gas flow field 34 and the oxygen-containing gas flow field 38 is small, and the flow rate of the coolant supplied to an area near the inlets of the fuel gas flow field 34 and the oxygen-containing gas flow field 38 is large.

Thus, in the sixth embodiment, the same advantages as in the case of, e.g., the first embodiment can be obtained. The fuel cell 10 is placed horizontally, and the fuel cell 110 is placed vertically. Thus, the fuel cell according to the present invention can be used in a variety of applications. Further, it should be noted that it is possible to select whether the fuel cell is placed horizontally or vertically also in the cases of the second to fifth embodiments.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking electrolyte electrode assemblies and separators alternately in a horizontal direction, said electrolyte electrode assemblies each including a pair of electrodes and an electrolyte interposed between said electrodes, wherein a reactant gas flow field for supplying a reactant gas is formed between said electrolyte electrode assembly and one of the separators sandwiching said electrolyte electrode assembly for supplying a reactant gas along a surface of said electrode, the reactant gas flow field extending straight from an inlet to an outlet of said reactant gas flow field, and a coolant flow field is formed between adjacent separators which are stacked together for allowing a coolant to flow in a direction substantially perpendicular to the flow direction of the reactant gas, and wherein
a plurality of coolant supply connection channels aligned in the width direction substantially perpendicular to the flow direction of the coolant in said coolant flow field are provided, said coolant supply connection channels being connected to said coolant flow field, and formed to pass through said fuel cell in the stacking direction; and
among said coolant supply connection channels, the flow rate of the coolant supplied from one of the coolant supply connection channels provided in an area near said outlet of said reactant gas flow field is smaller than the flow rate of the coolant supplied from another of the coolant supply connection channels provided in another area farther away from the area near said outlet of said reactant gas flow field,
wherein said plurality of coolant supply connection channels include coolant passages extending though said fuel cell in the stacking direction, and the cross sectional areas of openings of said coolant passages are different depending on the position in the width direction.

2. A fuel cell according to claim 1, wherein said reactant gas flow field is expanded from an area near an inlet of a coolant passage having a large opening in cross section, toward an area near an outlet of said coolant passage having a small opening in cross section, and in the area near the outlet, the number of grooves of said reactant gas flow field is large in comparison with the area near said inlet.

3. A fuel cell according to claim 1, wherein at least one of said plurality of coolant supply connection channels includes connection grooves connected to said coolant flow field, and intervals of said connection grooves are different depending on the position in the width direction.

4. A fuel cell according to claim 1, wherein a reactant gas supply passage and a reactant gas discharge passage connected to said reactant gas flow field extend through said fuel cell in the stacking direction;
said plurality of coolant supply connection channels include a coolant supply passage and a coolant discharge passage; and
said reactant gas supply passage and said reactant gas discharge passage are provided on the left and right sides of said separator and said coolant supply passage and said coolant discharge passage are provided on the upper and lower sides of said separator, or said reactant gas supply passage and said reactant gas discharge passage are provided on the upper and lower sides of said separator and said coolant supply passage and said coolant discharge passage are provided on the left and right sides of said separator.

5. A fuel cell according to claim 1, wherein a plurality of coolant discharge connections channels aligned in the width direction substantially perpendicular to the flow direction of the coolant in said coolant flow field is provided, said coolant discharge connection channels being formed to pass through said fuel cell in the stacking direction, and
the plurality of coolant supply connection channels are connected to one end of the coolant flow field and the plurality of coolant discharge connection channels are connected to the other end of the coolant flow field.

6. A fuel cell formed by stacking electrolyte electrode assemblies and separators alternately in a horizontal direction, said electrolyte electrode assemblies each including a pair of electrodes and an electrolyte interposed between said electrodes, wherein a reactant gas flow field for supplying a reactant gas is formed between said electrolyte electrode assembly and one of the separators sandwiching said electrolyte electrode assembly for supplying a reactant gas along a surface of said electrode, the reactant gas flow field extending straight from an inlet to an outlet of said reactant gas flow field, and a coolant flow field is formed between adjacent separators which are stacked together for allowing a coolant to flow in a direction substantially perpendicular to the flow direction of the reactant gas, and wherein
a plurality of coolant supply connection channels aligned in the width direction substantially perpendicular to the flow direction of the coolant in said coolant flow field is provided, said coolant supply connection channels being connected to said coolant flow field, and formed to pass through said fuel cell in the stacking direction; and
among said coolant supply connection channels, the flow rate of the coolant supplied from one of the coolant supply connection channels provided in an area near said inlet of said reactant gas flow field is larger than the flow rate of the coolant supplied from another of the coolant supply connection channels provided in another area farther away from the area near said inlet of said reactant gas flow field,
wherein said coolant supply connection channels include coolant passages extending though said fuel cell in the stacking direction, and the cross sectional areas of openings of said coolant passages are different depending on the position in the width direction.

7. A fuel cell according to claim 6, wherein said reactant gas flow field is expanded from an area near an inlet of a coolant passage having a large opening in cross section, toward an area near an outlet of said coolant passage having a small opening in cross section, and in the area near the outlet, the number of grooves of said reactant gas flow field is large in comparison with the area near said inlet.

8. A fuel cell according to claim 6, wherein at least one of said plurality of coolant supply connection channels includes connection grooves connected to said coolant flow field, and intervals of said connection grooves are different depending on the position in the width direction.

9. A fuel cell according to claim 6, wherein a reactant gas supply passage and a reactant gas discharge passage connected to said reactant gas flow field extend through said fuel cell in the stacking direction;
   said plurality of coolant supply connection channels include a coolant supply passage and a coolant discharge passage; and
   said reactant gas supply passage and said reactant gas discharge passage are provided on the left and right sides of said separator and said coolant supply passage and said coolant discharge passage are provided on the upper and lower sides of said separator, or said reactant gas supply passage and said reactant gas discharge passage are provided on the upper and lower sides of said separator and said coolant supply passage and said coolant discharge passage are provided on the left and right sides of said separator.

10. A fuel cell according to claim 6, wherein a plurality of coolant discharge connections channels aligned in the width direction substantially perpendicular to the flow direction of the coolant in said coolant flow field is provided, said coolant discharge connection channels being formed to pass through said fuel cell in the stacking direction, and
    the plurality of coolant supply connection channels are connected to one end of the coolant flow field and the plurality of coolant discharge connection channels are connected to the other end of the coolant flow field.

11. A fuel cell formed by stacking electrolyte electrode assemblies and separators alternately in a horizontal direction, said electrolyte electrode assemblies each including a pair of electrodes and an electrolyte interposed between said electrodes, wherein a reactant gas flow field for supplying a reactant gas is formed between said electrolyte electrode assembly and one of the separators sandwiching said electrolyte electrode assembly for supplying a reactant gas along a surface of said electrode, the reactant gas flow field extending straight from an inlet to an outlet of said reactant gas flow field, and a coolant flow field is formed between adjacent separators which are stacked together for allowing a coolant to flow in a direction substantially perpendicular to the flow direction of the reactant gas, and wherein
    a plurality of coolant supply connection channels aligned in the width direction substantially perpendicular to the flow direction of the coolant in said coolant flow field is provided, said coolant supply connection channels being connected to said coolant flow field, and formed to pass through said fuel cell in the stacking direction; and among said coolant supply connection channels, the flow rate of the coolant supplied from one of the coolant supply connection channels provided in an area near said outlet of said reactant gas flow field is smaller than the flow rate of the coolant supplied from another of the coolant supply connection channels provided in another area farther away from the area near said outlet of said reactant gas flow field, and the flow rate of the coolant supplied from one of the coolant supply connection channels provided in an area near said inlet of said reactant gas flow field is larger than the flow rate of the coolant supplied from another of the coolant supply connection channels provided in another area farther away from the area near said inlet of said reactant gas flow field, wherein said coolant supply connection channels include coolant passages extending though said fuel cell in the stacking direction, and the cross sectional areas of openings of said coolant passages are different depending on the position in the width direction.

12. A fuel cell according to claim 11, wherein said reactant gas flow field is expanded from an area near an inlet of a coolant passage having a large opening in cross section, toward an area near an outlet of said coolant passage having a small opening in cross section, and in the area near the outlet, the number of grooves of said reactant gas flow field is large in comparison with the area near said inlet.

13. A fuel cell according to claim 11, wherein at least one of said plurality of coolant supply connection channels includes connection grooves connected to said coolant flow field, and intervals of said connection grooves are different depending on the position in the width direction.

14. A fuel cell according to claim 11, wherein a reactant gas supply passage and a reactant gas discharge passage connected to said reactant gas flow field extend through said fuel cell in the stacking direction;
    said plurality of coolant supply connection channels include a coolant supply passage and a coolant discharge passage; and
    said reactant gas supply passage and said reactant gas discharge passage are provided on the left and right sides of said separator and said coolant supply passage and said coolant discharge passage are provided on the upper and lower sides of said separator, or said reactant gas supply passage and said reactant gas discharge passage are provided on the upper and lower sides of said separator and said coolant supply passage and said coolant discharge passage are provided on the left and right sides of said separator.

15. A fuel cell according to claim 11, wherein a plurality of coolant discharge connections channels aligned in the width direction substantially perpendicular to the flow direction of the coolant in said coolant flow field is provided, said coolant discharge connection channels being formed to pass through said fuel cell in the stacking direction, and
    the plurality of coolant supply connection channels are connected to one end of the coolant flow field and the plurality of coolant discharge connection channels are connected to the other end of the coolant flow field.

* * * * *